United States Patent [19]

Peterson

[11] Patent Number: 4,999,115
[45] Date of Patent: Mar. 12, 1991

[54] METHOD AND APPARATUS FOR USE IN SEPARATING SOLIDS FROM LIQUIDS

[75] Inventor: C. Lynn Peterson, Salt Lake City, Utah

[73] Assignee: Peterson Filters Corporation, Salt Lake City, Utah

[21] Appl. No.: 306,340

[22] Filed: Feb. 3, 1989

Related U.S. Application Data

[63] Continuation of Ser. No. 767,351, Aug. 19, 1985, abandoned.

[51] Int. Cl.$^5$ .............................................. C02F 1/56
[52] U.S. Cl. .................................. 210/728; 210/738; 210/202; 210/208; 210/219; 210/220; 210/519
[58] Field of Search ............ 210/728, 709, 714, 738, 210/110, 127, 207, 208, 219, 220, 221.1, 519, 202

[56] References Cited

U.S. PATENT DOCUMENTS

| | | | |
|---|---|---|---|
| 2,245,587 | 6/1941 | Hughes | 210/715 |
| 2,268,726 | 1/1942 | Tark | 210/196 |
| 2,382,490 | 8/1945 | Lawlor | 210/715 |
| 2,391,738 | 12/1945 | Prager | 210/209 |
| 3,377,274 | 4/1968 | Burke et al. | 210/738 |
| 3,397,788 | 8/1968 | Duff et al. | 210/208 |
| 3,523,889 | 8/1970 | Eis | 210/112 |
| 4,054,514 | 10/1977 | Oltmann | 210/208 |
| 4,055,494 | 10/1977 | Emmett | 210/519 |
| 4,146,471 | 3/1979 | Wyness | 210/207 |
| 4,226,714 | 10/1980 | Furness et al. | 210/738 |
| 4,274,958 | 6/1981 | Fitch | 210/208 |
| 4,293,416 | 10/1981 | Keoteklian | 210/208 |
| 4,303,517 | 12/1981 | Love et al. | 210/208 |
| 4,346,010 | 8/1982 | Ogino et al. | 210/714 |
| 4,592,845 | 6/1986 | Lejeune | 210/519 |
| 4,775,468 | 10/1988 | Peterson | 210/205 |

FOREIGN PATENT DOCUMENTS

| | | | |
|---|---|---|---|
| 1089128 | 11/1980 | Canada | 210/738 |
| 1225608 | 9/1966 | Fed. Rep. of Germany | 210/199 |
| 1599675 | 10/1981 | United Kingdom | 210/519 |
| 2143155 | 2/1985 | United Kingdom . | |

OTHER PUBLICATIONS

Oldshue et al., "Flocculator Impellors: A Comparison," CEP, May 1979, pp. 72-75.
Perry's Chemical Engineer's Handbook, 5th Ed., 1973, pp. 19-44-19-56.

Primary Examiner—Peter Hruskoci
Attorney, Agent, or Firm—K. S. Cornaby

[57] ABSTRACT

Apparatus and methods for continuous sedimentation-type separation of solids from liquids of a feed slurry in a thickener-clarifier-type tank operated by overflow removal of clarified liquid and underflow removal of a concentrated underflow slurry by using a flocculant in a zone of intense mechanical agitation provided by a rotatable impeller rotated at tip speeds of between approximately 300 to 600 feet per minute to produce relatively small, bead-like floccules directly above the concentrated underflow slurry.

28 Claims, 2 Drawing Sheets

METHOD AND APPARATUS FOR USE IN SEPARATING SOLIDS FROM LIQUIDS

This is a continuation of application Ser. No. 767,351, filed Aug. 19, 1985, now abandoned.

FIELD OF THE INVENTION

This invention is directed to method and apparatus for separating solids from liquids including the use of flocculating agents, such as polymers, and more particularly for separating fine solids having particle sizes of about 28 mesh by zero from liquids such as the refuse in a coal preparation plant.

BACKGROUND OF THE INVENTION

Various methods and apparatus for separating fine particle size solids from liquids are in use today. One such method and apparatus is disclosed in U.S. Pat. No. 3,523,889 to F. G. Eis. In this patent a flocculating agent is introduced into a slurry which is then discharged from a standpipe and its flow is arrested by a baffle and deflected outwardly for mixing with the liquid in the tank. In Eis, the slurry with the flocculating agent included therein is introduced into the tank in the midst of gentle agitation. Another method and apparatus is disclosed in U.S. Pat. No. 4,055,494 to R. C. Emmett, Jr. For Thickener Device And Method, and assigned to Envirotech Corporation. In the Emmett patent, the slurry to be separated is fed successively through four mixing stages and a portion of the flocculating agent is introduced and mixed in each stage using a rotating blade. The Emmett patent does not state the type of agitation in the mixing stages. However, testimony in a trial Amstar Corporation vs. Envirotech Corporation and Energy Fuels Nuclear, Inc., in the United States District Court For The District of Utah Central Division in a decision published May 3, 1983, shows that Envirotech sought to test a means of mechanically stirring flocculant and slurry with sufficient force to produce excellent floc formation but not so forceful as to destroy flocs once formed. J. Rosenbaum & J. Clemmer, "Liquid-Solids Separations," in J. Clegg & D. Foley, Uranium Ore Processing 172, 1980 (1958), ("the flocculant must be disseminated uniformly throughout the slurry without degrading the floccules. Intense agitation to distribute the reagent for maximum effectiveness degrades the fragile floccules, and thus defeats its own purpose.")

SUMMARY OF THE INVENTION

This invention relates to a gravity sedimentation method and apparatus for separating solids in fine particle sizes from a liquid using a flocculating agent, such as an activated polymer mixture, in the presence of intense agitation. In accordance with this invention, the floccules are not fragile but are very strong. In one embodiment of the invention, this is accomplished in a cone-shaped clarifier/thickener as part of a conventional coal preparation plant process.

In one embodiment of the invention, a vessel having a top, a cone-shaped bottom and a side wall is provided. A level of clarified liquid is maintained in the vessel in a conventional manner by extracting from the vessel clear overflow liquid and flocculated thickened underflow slurry at a rate substantially the same as the rate of feed slurry introduction and flocculating agent in solution introduction to maintain the level substantially constant. Thus, there exists at all times a volume of different per cent solids in in the vessel. An impeller is submerged in a lower portion of the volume of slurries and is spaced from the bottom of the vessel and located above a conventional rake mechanism. The impeller is rotated at speeds sufficient to create a zone of intense agitation in the vessel. A first plurality of spaced apart tubes having open ends are located in the vessel with their open ends adjacent to and above the plane of rotation of the impeller. A second plurality of spaced apart tubes having nozzles at one end thereof are located adjacent to the first plurality of tubes with the nozzles adjacent to and above the plane of rotation of the impeller. The slurry containing the solids to be separated from the liquid is introduced into the vessel through the first plurality of spaced apart tubes and the flocculating agent solution, such as an activated polymer in dilute mixture, is introduced into the vessel through the plurality of nozzles. As portions of the slurry and flocculating agent enter into the zone of intense agitation, the solids therein are acted on by the said dilute mixture and formed into relatively small and bead-like floccules. The beadlike floccules settle down onto the cone-shaped bottom, move into a drain well and are extracted from the vessel as a thickened slurry underflow and fed to a separation unit. A clear overflow is extracted from the vessel through an annular opening at the top of the side wall of the vessel in a conventional manner.

It is an object of this invention to separate fine sized solids from a liquid in a feed slurry by using a flocculating agent wherein the slurry and the flocculating agent are subjected to intense agitation to form relatively small and bead-like floccules.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE INVENTION

DETAILED DESCRIPTION OF THE INVENTION

Figure 1:
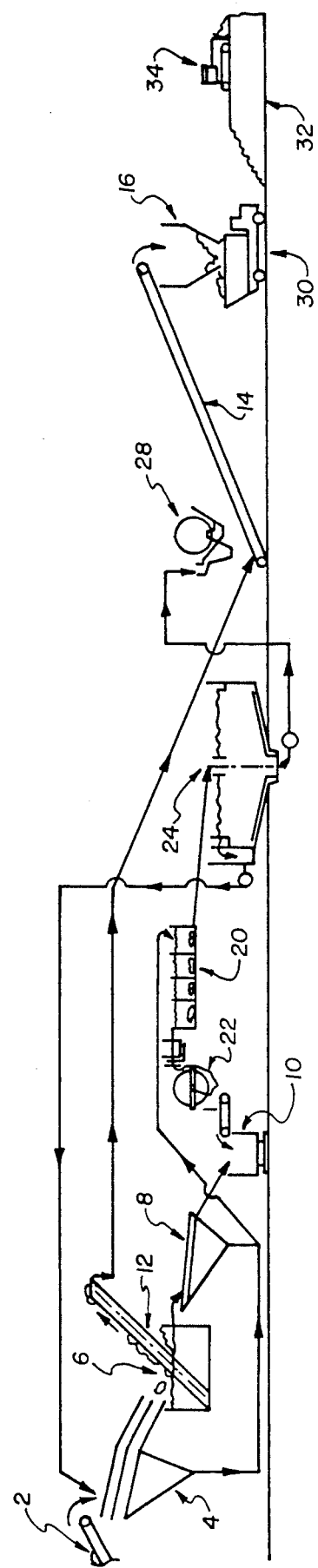
FIG. 1 is a schematic illustration of a flow diagram of a coal processing plant incorporating the invention.

In FIG. 1, there is schematically illustrated a flow diagram of a coal processing plant comprising a conveyor 2 carrying run of the mine material and dumping the material onto desliming screens 4 wherein the material is separated into a greater than 28 mesh size and a 28 mesh by zero size. The greater than 28 mesh material is fed into the jig 6 wherein water is used to separate the low ash coal from refuse, such as rock, slate and high ash disposable material. The separation is by specific gravity with the coal floating across the surface of the jig 6 and the refuse sinking to the bottom. The low ash coal is separated and fed into dewatering screens 8 and then into a rail car 10. The refuse is taken out of the jig 6 by conveyor 12 and transported to conveyor 14 and dumped into refuse truck bin 16.

The 28 mesh by zero size run of the mine material is fed into float cells 20 wherein the 28 mesh by zero size low ash coal is separated out and fed into a filter unit 22. Water and fine size material is drained from the dewatering screen 8 and is also fed into the float cells 20. The dewatered 28 mesh by zero low ash coal is transferred from the filter unit to the rail car 10. The 28 mesh by zero refuse sinks to the bottom of the float cells 20 and is transferred in slurry form to a thickener/clarifier 24 which is constructed and arranged as hereinafter described. The thickened 28 mesh by zero refuse is fed into the refuse filter 28. The filter cake of 28 mesh by zero refuse formed in the refuse filter 28 is deposited onto the greater than size 28 mesh refuse on the conveyor belt 14 to be dumped into refuse truck bin 16. The refuse is dumped from refuse truck bin 16 into trucks 30 and transported to gob pile 32 wherein cats 34 push and level out the refuse in the gob pile. The height in the gob pile is initially 12 inches and is then compacted to 4:1 to seal the gob pile from air to prevent spontaneous gob pile fires.

Figure 3:
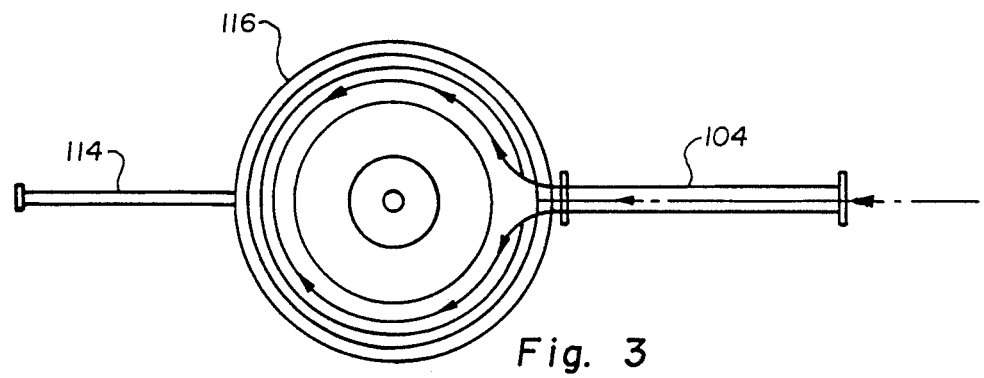
FIG. 3 is a top plan view of a portion of FIG. 2.
Figure 2:
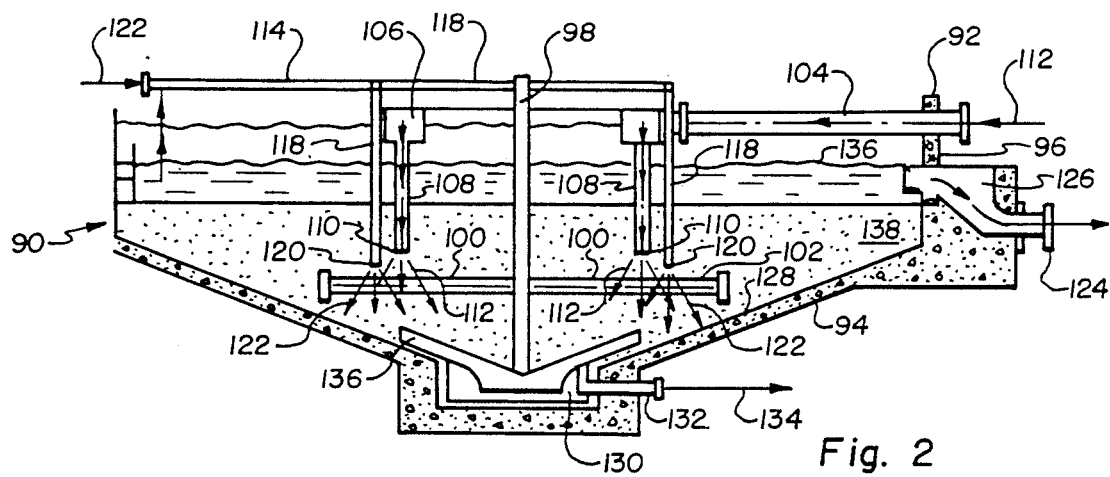
FIG. 2 is a schematic side elevational view of an embodiment of the invention.
Figure 4:
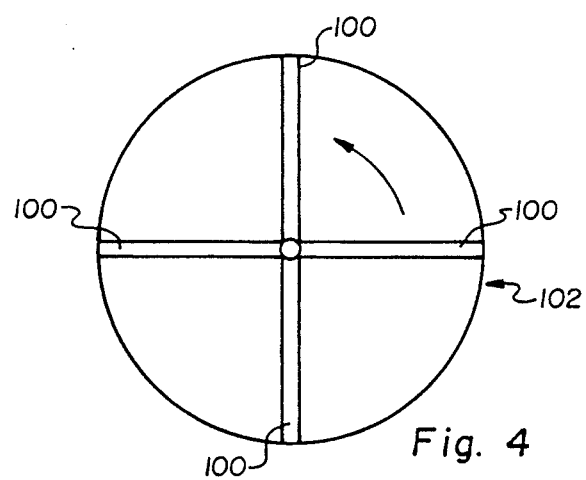
FIG. 4 is a bottom plan view of a portion of FIG. 3.

One embodiment of a thicker/clarifier 24 of the invention is illustrated in FIGS. 2–4 and comprises a vessel 90 having an open top 92, a cone-shaped bottom 94 and a side wall 96 which in the preferred embodiment is cylindrical. A rotatable shaft 98 having the blades 100 secured thereto, forms an impeller means for mechanical agitation of the slurry material in the vessel. The shaft 98 is supported and rotated by conventional. As illustrated in FIG. 4, the impeller preferably has four blades 100 spaced 90 degrees apart, but it is within the scope of this invention to use impellers 102 having different numbers of blades. The blades 100 are inclined relative to the vertical so as to exert a downward and annular force on the portions of the slurry in the vessel 90 that the blades 100 contact. However, in some instances the blades are parallel to the vertical.

inlet pipe 104 which passes through the side wall 96 adjacent to the top 92 and terminates in an annular feed header 106. A plurality of slurry feed tubes 108 extend downwardly from the header 106 and terminate with open ends 110 which are adjacent to and above the impeller 102. There are four slurry feed tubes 108 spaced 90 degrees apart but it is within the scope of this invention to use as many slurry feed tubes 108 as desired. The feed slurry 112 comprising the solids to be separated from the liquid is thus introduced into A central portion of the vessel 90 through the inlet pipe 104, the feed header 106 and the tubes 108 below the clarified zone 109 and above the impeller means 102. A flocculant feed means 111 comprising a conventional mixing and flow control supply means 113 and An inlet pipe 114 is located above the open top 92 and terminates in an annular flocculant feed header 116. A plurality of flocculant feed tubes 118 extend downwardly from the header 116 and are provided with nozzles 120 adjacent to and above the impeller 102. There are four flocculant feed tubes 118 spaced 90 degrees apart but it is within the scope of this invention to use as many tubes 118 as desired. The number of Flocculant Feed tubes 118 should correspond to the number of slurry feed tubes 108. A flocculating agent 122, such as an activated dilute polymer mixture is introduced into the vessel 90 through the inlet pipe 114, the header 116 and the feed tubes 118. An overflow outlet pipe 124 is located in an overflow weir 126 in the side wall 96 and is used to extract a clear overflow from the vessel 90 in a conventional manner.

The cone-shaped bottom wall 94 has surface 128 inclined at an angle sufficiently great to encourage movement of the bead-like floccules produced by the action of impeller means 102 as hereinafter described downwardly into a drain well 130. An outlet pipe 132 is used to extract a concentrated underflow slurry 134 comprising the bead-like floccules in a liquid from the vessel 90 through the drain well 130 in a conventional manner through a conventional separating means, such as the refuse filter 28. A conventional rake 136 mounted on shaft 98 is used in a conventional manner to assist in the movement of the thickened slurry and bead-like floccules into the drain well 130.

The rate of introduction of slurry 112 and flocculating agent 122 relative to the rate. of extraction of the clear overflow and slurry 134 functions in a conventional manner to maintain an upper clarified level 136 of material in the vessel 90 and cause the removal of suspended solid particles from the feed slurry liquid by gravity settling toward the bottom of the vessel in a conventional manner.

In operation the impeller means 102 is rotated at a rate sufficient to produce a tip speed of the blades 100 of between about 300 and 600 feet per minute and preferably about 500 feet per minute. This movement of the blades 100 through the slurry 138 produces a zone of intense agitation. The feed slurry 112 comprising the solids to be separated from the liquid flows out of the tubes 108 and the flocculating agent mixture 122 is sprayed out of the tubes 118 and immediately enters into the zone of intense agitation generated by the rotating blades 100. This intense agitation causes many collisions between the flocced solids so that the floccules finally formed are relatively small and appear to be generally bead-like in shape. When the slurry containing these relatively small and bead-like floccules is passed through a conventional filter, such as the refuse filter 28, the filter cakes formed thereby have densities much greater than the density of filter cakes formed from normally produced slurries. Baffles (not shown) are provided so as to prevent any tendency for the slurries in the vessel to swirl in response to the rotation of the blades.

The size of a unit illustrated in FIGS. 2–4 depends on the amount of material to be processed. In the embodiment of the invention illustrated in FIGS. 2–4, the vessel 90 has an inside diameter at the side wall 96 of about 40 feet. The impeller 102 has a tip diameter of about 20 feet. The impeller 102 is rotated at a rate sufficient to produce tip speeds of the blades 100 between about 300 and 600 feet per minute and preferably about 500 feet per minute. The feed slurry 112 is introduced into the vessel 90 through the open end 110 of each tube 108 at a rate of between about 400 and 600 gallons per minute and preferably about 530 gallons per minute and at a solids concentration of between about 3 and 8 per cent by weight and preferably about 4 per cent by weight. The concentrated underflow slurry 134 comprising the floccules in a liquid has a concentration of between about 35 and 50 per cent solids by weight, and preferably about 40 per cent solids by weight. The flocculating agent, comprising an activated polymer mixture at a dilute concentration less than about 0.5 per cent by weight and preferably about 0.03 per cent by weight is introduced through the nozzle 120 of each tube 118. The activated polymer may be cationic, moderately anionic or anionic or a mixture thereof. The rotation of the impeller 102 and the velocity of the feed slurry and the flocculating agent produce a zone of intense agitation to form the solids in the feed slurry into relatively small and bead-like floccules which sink to the bottom surface 128. The rate of overflow is between 1 GPM(gallons per minute)/square foot of overflow area and 4.0 GPM/square foot of overflow area and preferably about 2.0 GPM/square foot of overflow area.

Thus, the present invention provides a thickener/clarifier type apparatus and method for use in sedimentation-type separating of slurry solids, such as coal particles, from liquids such as water. The apparatus and method comprise a conventional thickener-clarifier-type vessel having a bottom and a side wall; forming a volume of solids and liquids in the vessel; maintaining the volume of solids and liquids in the vessel substantially constant by controlling the feed input and the overflow and underflow output of the solids and liquids in a conventional manner; continuously moving a rotary impeller having a plurality of blades through the volume of solids and liquids to form a zone of intense agitation by rotating the impeller at rates sufficient to move each of the blades at a tip speed of between about 300 and 600 feet per minute; continuously introducing a feed slurry comprising solids in a liquid into the zone of intense agitation; continuously introducing a flocculating agent into the zone of intense agitation so that the flocculating agent acts on the feed slurry to form the solids therein into floccules; continuously removing clear liquid through an overflow means located adjacent to a top side portion of the side wall; continuously allowing the floccules to settle to the bottom to provide a concentrated underflow slurry; continuously withdrawing the concentrated underflow slurry from the bottom of the vessel. The apparatus and method further comprise introducing the feed slurry and the flocculating agent substantially simultaneously and at adjacent locations. The method further comprises introducing the feed slurry and the flocculating agent at a plurality of circumferentially spaced apart locations. The floccules thus formed are relatively small and bead-like in shape. The flocculating agent has a concentration of less than about 0.5 percent by weight and preferably, about 0.03 percent by weight.

In one embodiment, the solids in the feed slurry comprise 28 mesh by zero refuse from a coal processing plant and the impeller is rotated at rates sufficient to move each of the blades at a tip speed of about 500 feet per minute. The concentrated underflow slurry is delivered to a conventional filter apparatus for further processing.

The feed slurry and the flocculating agent are introduced substantially simultaneously by feed means located adjacent to one another. The feed slurry means comprises a plurality of circumferentially spaced apart open ended tubes and the flocculant feed means comprises a plurality of circumferentially spaced apart nozzles.

It is contemplated that the inventive concepts herein described may be variously otherwise embodies and it is intended that the appended claims be construed to include alternative embodiments of the invention except insofar as limited by the prior art.

What is claimed is:

1. A method for use in separating solids from a liquid comprising:
    providing a vessel having a bottom and a side wall;
    forming a volume of solids and liquids in said vessel and creating an uppermost zone of clarified liquid in an upper portion of the vessel and a lowermost zone of concentrated solids in a bottom portion of the vessel with an intermediate central settling zone therebetween
    maintaining said volume of solids and liquids in said vessel substantially constant by controlling the input and output of solids and liquids;
    mounting an impeller means and a vertical impeller drive shaft means centrally in said vessel means and providing a vertical central axis of rotation;
    said impeller means being mounted on said drive shaft means and extending radially outwardly therefrom and having tip portions defining a circumferential path of travel which is located in the slurry material in the intermediate central settling zone and spaced radially inwardly from the side wall portion of said vessel means and upwardly above the lowermost zone continuously discharging a feed slurry directly into said intermediate central settling zone adjacent said impeller means through slurry feed means; continuously discharging a flocculant mixture through flocculant feed means directly into said intermediate central settling zone adjacent said impeller means and said slurry feed means said impeller means mounted in said intermediate central settling zone directly above said lowermost zone for creating a zone of intense mechanical agitation by rotation at tip speeds of between approximately 300 to 600 feet per minute to create relatively small bead-like floccules for delivery to said lowermost zone;
    said slurry feed means comprises a plurality of circumferentially spaced downwardly extending slurry feed pipe means which are radially outwardly spaced a substantial distance from said central axis of rotation and located in said intermediate central settling zone between said shaft means and said tip portions;
    said slurry feed pipe means have discharge opening means located in said intermediate central settling zone directly above and adjacent to said impeller means; and
    said flocculant feed means comprises a plurality or circumferentially spaced downwardly extending flocculant feed pipe means which are radially outwardly spaced a substantial distance from said central axis of rotation and located between said shaft means and said tip portions.
    continuously removing clear liquid through an overflow means located adjacent to a top of said side wall;
    continuously allowing said floccules to settle to said bottom;
    continuously withdrawing a second slurry comprising said floccules and a liquid from said bottom of said vessel; and
    continuously separating said floccules from said liquid.

2. The method as in claim 1 and further comprising:
    introducing said feed slurry and said flocculant mixture into the zone of intense agitation substantially simultaneously.

3. A method as in claim 2 wherein: said flocculant mixture has a concentration of less than about 0.5 percent by weight.

4. A method as in claim 2 wherein:
    said solids in said feed slurry comprise 28 mesh by zero refuse from a coal processing plant.

5. A method as in claim 4 and further comprising:
rotating said impeller means at rates sufficient to move each of said blades at a tip speed of about 500 feet per minute.

6. The invention as defined in claim 2 and wherein:
the rate of flow of the feed slurry is between about 400 and 600 gallons per minute.

7. The invention as defined in claim 6 and wherein:
the concentration of solids in the feed slurry is about 8 percent or less of solids by weight; and
the concentration of the concentrated underflow slurry is between about 35 to 50% of solids by weight.

8. The invention as defined in claim 6 and wherein:
the concentration of the flocculant mixture is less than about 0.5 percent by weight.

9. The invention as defined in claim 8 and wherein:
the concentration of the flocculant mixture is about 0.03 percent by weight; and
the solids in the feed slurry are of approximately 28×0 mesh size.

10. The invention as defined in claim 6 and wherein:
the rate of overflow is between about one to four gallons per minute per square foot of overflow area.

11. Apparatus for gravity sedimentation separation of solids from liquids comprising:
a thickener-clarifier-type vessel means for holding a substantially constant volume of a feed slurry and creating an uppermost zone of clarified liquid in an upper portion of the vessel means and a lowermost zone of concentrated solids in a bottom portion of the vessel means with an intermediate central settling zone therebetween which are in direct and open unrestricted free-flow communication with one another;
overflow means for continuously removing the clarified liquid from the upper portion of the vessel means;
underflow means for continuously removing the highly concentrated solids from the bottom portion of the vessel means;
an impeller means mounted in said intermediate central settling zone directly above said lowermost zone for creating a zone of intense mechanical agitation by rotation at tip speeds of between approximately 300 to 600 feet per minute to create relatively small bead-like floccules for delivery to said lowermost zone;
slurry feed means for continuously discharging a feed slurry directly into said intermediate central settling zone adjacent said impeller means;
flocculant feed means for continuously discharging a flocculant mixture directly into said intermediate central settling zone adjacent said impeller means and said slurry feed means;
a vertical impeller drive shaft means centrally mounted in said vessel means and providing a vertical central axis of rotation;
said impeller means being mounted on said drive shaft means and extending radially outwardly therefrom and having tip portions defining a circumferential path of travel which is located in the slurry material in the intermediate central settling zone and spaced radially inwardly from the side wall portion of said vessel means and upwardly above the lowermost zone;

said slurry feed means comprises a plurality of circumferentially spaced downwardly extending slurry feed pipe means which are radially outwardly spaced a substantial distance from said central axis of rotation and located in said intermediate central settling zone between said shaft means and said tip portions;
said slurry feed pipe means have discharge opening means located in said intermediate central settling zone directly above and adjacent to said impeller means; and
said flocculant feed means comprises a plurality of circumferentially spaced downwardly extending flocculant feed pipe means which are radially outwardly spaced a substantial distance from said central axis of rotation and located between said shaft means and said tip portions.

12. The invention as defined in claim 1 and further comprising:
a rotatable rake means mounted on said drive shaft means and being located below said impeller means in said lowermost zone of concentrated underflow slurry material; and
the diameter of said rake means being less than the diameter of said impeller means.

13. The invention as defined in claim 12 and wherein:
said uppermost zone and said intermediate zone and said lowermost zone extending radially without interruption from and between said drive shaft means and the side wall portions of said vessel means and completely surrounding said drive shaft means and said slurry feed means and said flocculant feed means and said impeller means.

14. The invention as defined in claim 13 and wherein:
said vessel means having a downwardly inwardly inclined lowermost side wall portion terminating in a bottom well portion whereat said concentrated underflow slurry is removed by said underflow means.

15. The invention as defined in claim 14 and wherein:
said impeller means being located in an horizontal plane which intersects an intermediate portion of said inclined lowermost side wall portion; and
said rake means having a lowermost portion located in said well portion.

16. A method for gravity sedimentation separation of solids from liquids in a thickener-clarifier-type vessel means for holding a substantially constant volume of a feed slurry and creating an uppermost zone of clarified liquid in an upper portion of the vessel means and a lowermost zone of highly concentrated underflow slurry solids in a bottom portion of the vessel means with an intermediate central settling zone therebetween which is in communication with an overflow means for continuously removing the clarified liquid from the upper portion of the tank means and with an underflow means for continuously removing the highly concentrated underflow slurry solids from the bottom portion of the vessel means;
the method comprising:
mounting a drive shaft having a central axis of rotation and an impeller means including tip portions in said central settling zone directly above said lowermost zone;
creating a zone of intense mechanical agitation by rotation of said impeller means at tip speeds of between approximately 300 to 600 feet per minute to create relatively small bead-like floccules for delivery to said lowermost zone;

continuously discharging a feed slurry directly into said intermediate central settling zone adjacent said impeller means through slurry feed means;

said slurry feed means comprises a plurality of circumferentially spaced downwardly extending slurry feed pipe means which are radially outwardly spaced a substantial distance from said central axis of rotation and located in said intermediate central settling zone between said shaft means and said tip portions;

said slurry feed pipe means have discharge opening means located in said intermediate central settling zone directly above and adjacent to said impeller means; continuously discharging a flocculant mixture directly into said intermediate central settling zone adjacent said impeller means and said slurry feed means;

said flocculant feed means comprises a plurality of circumferentially spaced downwardly extending flocculant feed pipe means which are radially outwardly spaced a substantial distance from said central axis of rotation and located between said shaft means and said tip portions.

17. A method for gravity sedimentation separation of solids from liquids in a thickener-clarifier-type vessel means for holding a substantially constant volume of a feed slurry and providing an uppermost zone of clarified liquid in an upper portion of the vessel means and a lowermost zone of highly concentrated slurry solids in a bottom portion of the vessel means with an intermediate central settling zone therebetween with the zones being in direct communication with one another, the vessel means having an overflow means for continuously removing the clarified liquid from the upper portion of the vessel means and an underflow means for continuously removing the highly concentrated slurry solids from the bottom portion of the vessel means; the method comprising:

mounting a drive shaft having a central axis of rotation and an impeller means including tip portions in said intermediate central settling zone directly above said lowermost zone;

continuously discharging a feed slurry through a slurry feed means directly into said intermediate central settling zone adjacent said impeller means;

said slurry feed means comprises a plurality of circumferentially spaced downwardly extending slurry feed pipe means which are radially outwardly spaced a substantial distance from said central axis of rotation and located in said intermediate central settling zone between said shaft means and said tip portions;

said slurry feed pipe means have discharge opening means located in said intermediate central settling zone directly above and adjacent to said impeller means; continuously discharging a flocculant mixture directly into said intermediate central settling zone adjacent said impeller means and said slurry feed means;

said flocculant feed means comprises a plurality of circumferentially spaced downwardly extending flocculant feed pipe means which are radially outwardly spaced a substantial distance from said central axis of rotation and located between said shaft means and said tip portions;

continuously rotating said impeller means at tip speeds of between approximately 300 to 600 feet per minute to mix said feed slurry and said flocculant mixture by intense mechanical agitation and create relatively small bead-like floccules in said intermediate central settling zone for delivery to said lowermost zone by gravity sedimentation; and creating a layer of highly concentrated relatively small bead-like floccules in said lowermost zone by gravity flow from said intermediate central settling zone to said lowermost zone.

18. The invention as defined in claim 17 and wherein: the rate of flow of the feed slurry is between about 400 and 600 gallons per minute.

19. The invention as defined in claim 18 and wherein: the concentration of solids in the feed slurry is about 8 percent or less of solids by weight.

20. The invention as defined in claim 19 and wherein: the concentration of the concentrated underflow slurry is between about 35 to 50% of solids by weight.

21. The invention as defined in claim 19 and wherein: the concentration of the flocculant mixture is less than about 0.5 percent by weight.

22. The invention as defined in claim 21 and wherein: the concentration of the flocculant mixture is about 0.03 percent by weight.

23. The invention as defined in claim 17 or 21 and wherein:
the solids in the feed slurry are of approximately 28×0 mesh size.

24. The invention as defined in claim 23 and wherein: the rate of overflow is between about one to four gallons per minute per square foot of overflow area.

25. The invention as defined in claim 17 or 21 and wherein:
the flocculant mixture is anionic.

26. The invention as defined in claim 25 and wherein: the flocculant mixture is cationic.

27. The invention as defined in claim 26 and wherein: the flocculant mixture is a mixture of anionic and cationic.

28. A thickener-clarifier system comprising:
thickener-clarifier-type vessel means having a lowermost bottom wall portion and an outermost annular side wall portion with an annular uppermost rim portion for providing a processing chamber means and for holding a relative large volume of slurry material and for providing a lowermost sludge zone of highly concentrated solid materials located along the bottom wall portion and an upper clarified liquid zone of clarified liquid located along the rim portion and an intermediate unrestricted flow slurry zone of slurry material between the bottom sludge zone and the upper clarified liquid zone;

sludge removal means located in said bottom wall portion for removing concentrated solid materials from said lowermost sludge zone;

clarified liquid removal means located along said rim portion for removing clarified liquid from said upper clarified liquid zone;

rotatable blade means including tip portions mounted in said intermediate unrestricted flow slurry zone in said vessel means and having a central vertical axis of rotation which is coaxial with the central vertical axis of said vessel means and extending radially outwardly therefrom to said side wall portion and being spaced upwardly from said bottom wall portion a sufficient distance to be located above said lowermost sludge zone and being spaced downwardly from said rim portion a sufficient distance to be located below said upper clarified liquid zone; and drive shaft means mounted in said vessel means in coaxial relationship with said axis of rotation and said central vertical axis of said vessel means for driving said blade means to create a zone of intense mechanical agitation by rotation at tip speeds of between approximately 300 to 600 feet per minute to create relatively small bead-like floccules for delivery to said lowermost sludge zone;

slurry feed means having outlet opening means located within the intermediate unrestricted flow slurry zone for feeding the slurry material into the said intermediate unrestricted flow slurry zone of said vessel means;

said slurry feed means comprises a plurality of circumferentially spaced downwardly extending slurry feed pipe means which are radially outwardly spaced a substantial distance from said central axis of rotation and located in said intermediate unrestricted flow slurry zone between said shaft means and said tip portions;

said slurry feed pipe means have discharge opening means located in said intermediate unrestricted flow slurry zone directly above and adjacent to said impeller means; and flocculant feed means for feeding a flocculant mixture into said intermediate unrestricted flow slurry zone of said vessel means said flocculant feed means comprises a plurality of circumferentially spaced downwardly extending flocculant feed pipe means which are radially outwardly spaced a substantial distance from said central axis of rotation and located between said shaft means and said tip portions.

* * * * *

UNITED STATES PATENT AND TRADEMARK OFFICE
CERTIFICATE OF CORRECTION

PATENT NO. : 4,999,115

DATED : March 12, 1991

INVENTOR(S) : C. Lynn Peterson

It is certified that error appears in the above-identified patent and that said Letters Patent is hereby corrected as shown below:

Column 3, line 47, delete "A", should read --a--; line 60, delete "Flocculent Feed", should read --flocculent feed--.

Column 4, line 4, following "described" insert --,--.

Column 6, line 3, following "therebetween" insert --;--.

Signed and Sealed this

Sixth Day of October, 1992

Attest:

DOUGLAS B. COMER

*Attesting Officer*   *Acting Commissioner of Patents and Trademarks*